United States Patent

Scobey et al.

[11] Patent Number: 5,859,717
[45] Date of Patent: Jan. 12, 1999

[54] MULTIPLEXING DEVICE WITH PRECISION OPTICAL BLOCK

[75] Inventors: Michael A. Scobey, Marlborough; Derek E. Spock, Watertown; Michael E. Grasis, East Brookfield; Robert W. Lafreniere, Tewksbury, all of Mass.

[73] Assignee: Corning OCA Corporation, Marlborough, Mass.

[21] Appl. No.: 800,693

[22] Filed: Feb. 14, 1997

[51] Int. Cl.[6] .................................................. H04J 14/02
[52] U.S. Cl. .............................. 359/124; 359/127; 385/24
[58] Field of Search .................................... 359/124, 127, 359/131; 385/24

[56] References Cited

U.S. PATENT DOCUMENTS

| 4,244,045 | 1/1981 | Nosu et al. | 370/3 |
| 5,005,935 | 4/1991 | Kunikane et al. | 350/96.16 |
| 5,099,114 | 3/1992 | Matsumoto et al. | 359/124 |
| 5,583,683 | 12/1996 | Scobey | 359/127 |

FOREIGN PATENT DOCUMENTS

| 0 260 654 | 3/1988 | European Pat. Off. . |
| 2 014 752 | 8/1979 | United Kingdom . |

Primary Examiner—Kinfe-Michael Negash
Attorney, Agent, or Firm—William Greener, Esq.

[57] ABSTRACT

An optical multiplexing device demultiplexes collimated light from a fiber-optic source into separate individual wavelength sub-ranges or channels, and/or multiplexes separate channels to a common fiber-optic waveguide or other destination. An optical block defines an optical gap between two parallel surfaces having an optical port on a first such parallel surface for passing the multi-channel collimated light into the optical gap. A channel port and at least one other reflective element, e.g., multiple channel ports arrayed in spaced relation to each other, are secured to the optical block at the parallel surfaces, providing an unobstructed, epoxy-free multi-point light path within the optical gap. At each channel port an interference filter secured to the optical block spans the optical gap. Each filter transmits a wavelength sub-range of the multi-channel collimated light passed by the optical port, and reflects other wavelengths. Thus, a wavelength sub-range of the multi-channel light passed through the optical gap to a first channel port, which is in-band of that first channel port, is transmitted through that first channel port. Light not transmitted through that first channel port is reflected back through the optical gap, e.g., to strike a second channel port, at which a second, different wavelength sub-range is transmitted. The reflected optical signal thus cascades in a "multiple-bounce" sequence through the optical gap of the multiplexing device, sequentially adding and/or removing channels.

60 Claims, 6 Drawing Sheets

MULTIPLEXING DEVICE WITH PRECISION OPTICAL BLOCK

INTRODUCTION

The present invention is directed to an optical multiplexing device which spatially disperses collimated multi-wavelength light from a fiber-optic waveguide into individual channels, i.e., wavelength bands or sub-ranges, each of which can be directed to an individual fiber-optic waveguide output line, light detector, etc., and/or multiplexes individual wavelength sub-ranges to a common fiber-optic waveguide or other destination. In certain preferred embodiments, the improved multiplexing devices of the present invention are particularly well suited for dense channel wavelength division multiplexing systems for fiber-optic telecommunications systems.

BACKGROUND

While fiber-optic cable is finding widespread use for data transmission and other telecommunication applications, the relatively high cost of new installed fiber-optic cable presents a barrier to increased carrying capacity. Wavelength division multiplexing (WDM) allows multiple different wavelengths to be carried over a common fiber-optic waveguide. Presently preferred wavelength bands for fiber-optic transmission media include those centered at 1.3 micrometer and 1.55 micrometer (micrometer is written "$\mu$m" below). The latter, with a useful bandwidth of approximately 10 to 40 nm depending on the application, is especially preferred because of its minimal absorption and the commercial availability of erbium doped fiber amplifiers. Wavelength division multiplexing can separate this bandwidth into multiple channels. Dividing bandwidth into multiple discreet channels, such as 4, 8, 16 or even as many as 32 channels, through a technique referred to as dense channel wavelength division multiplexing (DWDM), is a relatively lower cost method of substantially increasing telecommunication capacity, using existing fiber-optic transmission lines. Thus, wavelength division multiplexing may be used in a fiber-optical telecommunication system supplying voice and data transmission, as well as video-on-demand and other existing or planned multimedia, interactive services. Techniques and devices are required, however, for multiplexing the different discreet carrier wavelengths. That is, the individual optical signals must be combined onto a common fiber-optic line or other optical waveguide and then later separated again into the individual signals or channels at the opposite end or other point along the fiber-optic cable. Thus, the ability to effectively combine and then separate individual wavelengths (or wavelength sub-ranges) from a broad spectral source is of growing importance to the fiber-optic telecommunications field and other fields employing optical instruments.

Optical multiplexers are known for use in spectroscopic analysis equipment and for the combination or separation of optical signals in wavelength division multiplexed fiber-optic telecommunications systems. Known devices for this purpose have employed, for example, diffraction gratings, prisms and various types of fixed or tunable filters. Gratings and prisms typically require complicated and bulky alignment systems and have been found to provide poor efficiency and poor stability under changing ambient conditions. Fixed wavelength filters, such as interference coatings, can be made substantially more stable. In this regard, highly improved interference coatings of metal oxide materials, such as niobia and silica, can be produced by commercially known plasma deposition techniques, such as ion assisted electron beam evaporation, ion beam sputtering, reactive magnetron sputtering, e.g., as disclosed in U.S. Pat. No. 4,851,095 to Scobey et al and in U.S. Pat. No. 5,525,741 to Scobey. Such coating methods can produce interference cavity filters formed of stacked dielectric optical coatings which are advantageously dense and stable, with low film scatter and low absorption, as well as low sensitivity to temperature changes and ambient humidity. The theoretical spectral performance of a stable, three-cavity tilted filter (tilted, for example, at about 8° from normal) produced using such advanced deposition methods is shown in FIG. 1 of the appended drawings. The spectral profile of FIG. 1 shows transmission through a tilted filter element resulting in polarization splitting of the signal. Polarization splitting can results in polarization dependent loss (PDL), that is, differential signal loss for the P-polarization and the S-polarization components or states of the signal. It will be understood that a higher tilt angle results in greater polarization splitting and, therefore, can result in correspondingly higher PDL. However, high performance, multi-cavity filters (for example, 3 to 5 cavity Fabry-Perot type interference filters wherein the film stack is formed of deposited films of near unity density) yield a flat in-band transmission zone, as shown in FIG. 1. This reduces polarization dependent loss, because the two polarization states overlap in-band. A high performance filter here means one providing such a flat in-band transmission zone and correspondingly low (for example, less than 1 dB, preferably less than ½ dB) insertion loss. In optical multiplexing devices intended for the teleconmmunications industry, preferably there is as little polarization dependent loss as possible in the optical signal path. The filter performance shown in FIG. 1 is seen to be suitable to meet stringent telecommunication system specifications.

Alternative approaches for selectively removing or tapping a channel, i.e., selective wavelengths, from a main trunk line carrying multiple channels, i.e., carrying optical signals on a plurality of wavelengths or wavelength sub-ranges, is suggested, for example, in U.S. pat. No. 4,768,849 to Hicks, Jr. In that patent filter taps are shown, as well as the use of gangs of individual filter taps, each employing high performance, multi-cavity dielectric pass-band filters and lenses for sequentially removing a series of wavelength sub-ranges or channels from a main trunk line. The filter tap of Hicks returns a multi-channel signal to the main trunk line as it passes the desired channel to a branch line. Optical multiplexing devices are shown also in U.S. Pat. No. 4,244,045 to Nosu et al, for multiplexing or demultiplexing a multi-channel optical signal. A row of individual optical filters are glued side-by-side onto the surface of an optical substrate, and a second row is glued similarly to the opposite surface of the substrate. Each individual filter transmits a different channel, that is, a preselected wavelength(s), and reflects other wavelengths. A multi-channel optical beam from a trunk line enters the optical substrate at an angle and passes thru the substrate from filter to filter in a zig-zag fashion. Each filter transmits its preselected wavelength(s) and reflects the remainder of the beam on to the next filter. Each filter element is sandwiched between glass plates, and a prism element is positioned between each filter sandwich and a corresponding collimator positioned behind the filter sandwich to receive the transmitted wavelength(s). Nosu et al teaches the use of refractive index matching. The lenses, filters, optical substrate, etc. all have the same refractive index and are in surface-to-surface contact with one another, such that the light beam does not pass through air. This approach by Nosu et al involves the use of prisms as an optical bridge between the filter element and the collimater at each channel outlet. This elaborate design approach adds considerable cost and assembly complexity to multiplexing devices of the type shown in Nosu et al. The quite wide (20 nm half width) and undesirably "peaky" pass-band of FIG. 5 of Nosu et al ("peaky" here meaning not having a flatter top for the pass-band, such as in FIG. 1 of the drawings appended hereto) are characteristic for the mono-cavity filters taught by Nosu et al and shown there in FIG. 4. Devices with such pass-band characteristics as in Nosu et al have higher polarization dependent losses (PDL) as discussed above. In that regard, FIG. 5 of Nosu et al must be understood to represent an average of the actual S-polarization and P-polarization pass-bands which would be shown more accurately as being slightly offset from each other. With such a peaky pass-band, any slight change in the signal wavelength (e.g., due to normal system instability or variability) will result in undesirably high PDL by unequally effecting the S-polarization component of the signal and its P-polarization component.

Devices such as those of Nosu et al employ adhesive in the light path, e.g., to adhere the prisms to the collumations and filter sandwiches. This is undesirable for several reasons. There is uncertainty as to the long term (e.g., 10 years) durability or stability of adhesives in such devices. The transparency of epoxy or other adhesive may change after exposure to thermal cycling, etc. Also, such "glue in the path" limits the power handling capability of the device, since higher power laser signals passing through the adhesive are known in at least certain applications to degrade the adhesive and change its optical properties. Therefore, it would be desirable to avoid or reduce the use of an adhesive in the light path, such as epoxy between optical elements, e.g., epoxy between a filter element and the surface of an optical substrate. In optical multiplexing devices intended for the telecommunications industry, preferably there is as little as possible adhesive in the optical signal path.

It is an object of the present invention to provide improved optical multiplexing devices which reduce or wholly overcome some or all of the aforesaid difficulties inherent in prior known devices. Particular objects and advantages of the invention will be apparent to those skilled in the art, that is, those who are knowledgeable and experienced in this field of technology, in view of the following disclosure of the invention and detailed description of certain preferred embodiments.

SUMMARY OF THE INVENTION

In accordance with a first aspect, an optical multiplexing device comprises an optical block defining an optical gap between first and second parallel surfaces of the block, with an optical port for passing multi-channel collimated light into and/or out of the optical gap, at least one channel port comprising a selectively transparent optical filter element secured to one of the parallel surfaces so as to face the optical gap at its boundary on one side, and at least one additional reflective element, such as a broadband reflector or the selectively transparent optical filter element of another channel port, secured to the other parallel surface so as to face the optical gap at its boundary on that second side. The optical gap is an air space, meaning that it contains atmospheric air or other suitable gas, preferably dry gas, such as nitrogen substantially free of $H_2O$ vapor. Optionally, in the case of multiplexing devices as disclosed here which are contained within an hermetically sealed housing, a vacuum may be drawn on the optical gap to any suitable reduced pressure level. The optical filter element of each channel port is optically transparent to a selected wavelength sub-range of multi-channel collimated light, and reflective of other wavelengths. Thus, a channel port of the multiplexing device passes a selected channel (or, optionally, multiple channels) to a branch line, InGaAsP infrared detector suitable for use in an optical telecommunication system or other light sensor, etc., while reflecting other channels back again through the optical gap to a next downstream channel port or other destination. In accordance with preferred embodiments, at least one such selectively reflective filter element of a channel port is secured to the optical block to span the optical gap at one of the parallel sides, and a reflective element, such as a broadband reflector, a selectively reflective filter element of a second channel port and/or other reflective element, is secured to the optical block to span the optical gap at the opposite parallel side. A multipoint zig-zag light path is thus established within the optical block, passing back and forth through the optical gap between the two parallel sides.

The optical block can be formed of metal or ceramic or any other suitable, preferably non-transparent material. Various suitable non-transparent materials, such as metals and ceramics, are readily commercially available at reasonable cost and provide excellent machinability or formability. The optical block disclosed here can be formed of non-transparent material, since the light path through the optical block is in a slot or other gap defined by the optical block, extending from the plane of the first parallel side to the place of the other parallel side of the optical block. Depending upon the application of the optical multiplexing device, multi-channel collimated light may be passed through the optical port into the optical gap of the optical block to be demultiplexed, or through multiple channel ports into the optical gap and then downstream to exit the optical block through the optical port as a multiplexed signal to a fiber-optic transmission line or other destination. In accordance with certain highly preferred embodiments, a multiplexing device in accordance with this disclosure may simultaneously both demultiplex a multi-channel signal entering the optical gap via the optical port and exiting via one or more channel ports, and also multiplex one or more channels entering the optical gap via one or more channel ports and exiting via the optical port.

As illustrated below in connection with certain preferred embodiments, the optical block preferably has multiple channel ports, each transparent to a different channel or set of channels. Thus, each such channel port transmits a wavelength sub-range of the multi-channel collimated light passed by the optical port. A residual port may also be provided which is transparent to wavelengths not passed by the one or more channel ports of the multiplexing device. In these preferred embodiments, the optical gap is an enclosed optical slot passing through the body of the optical block, and each channel port of the multiplexing device comprises an interference filter on the optical block at one of the parallel sides to span such optical slot.

A filter element is not necessarily required for the last (downstream) channel port in the devices disclosed here, when used in a demultiplexing mode, if all other channels or wavelengths already have been removed (by other, upstream channel ports) from the multi-channel light received into the optical gap via the optical port. In this regard, such last channel port is like a residual port, passing whatever remains at that point of the multi-channel collimated light. Similarly, in a multiplexing mode or embodiment, a filter element is not necessarily required at the first (upstream) channel port (or residual port), where there is no need to selectively reflect away any other wavelengths at that port. In those embodiments of the multiplexing device of the invention which are for both multiplexing and demultiplexing, a filter element is used at each location along the light path through the optical gap where a selected wavelength sub-range must be passed into or out of the optical gap and other wavelengths must be reflected back into the optical gap to travel further upstream or downstream along the light path.

As discussed further below, the interference filter of a channel port may be a high performance bandpass filter, preferably a narrow bandpass (i.e., channel or wavelength sub-range) filter transparent to a selected wavelength sub-range. In preferred embodiments, the bandpass of one channel port is separated from the bandpass of any next adjacent channel port(s) by as little as 8 nm, 2 um, 1 nm or even less for dense wavelength division multiplexing (DWDM). Alternatively, the channel port could be dichroic, i.e., a long wavepass or short wavepass edge filter, preferably with a very sharp transition point. In such an embodiment having multiple channel ports, the transition point of each channel port would be set at a slightly (e.g., 2 nm) longer (or shorter) boundary wavelength. Using such device with dichroic filters in a demultiplexing operation, where multi-channel collimated light is passed through the optical port into the optical block, each channel port, in turn, would pass or transmit out of the optical block only optic signals in its incremental range beyond the boundary wavelength of the previous channel port, since all light at shorter (or longer) wavelengths would already have been removed by the previous channel port(s). Light beyond the boundary wavelength of each channel port would be reflected, in accordance with the above described principles of operation to the next channel port (if any) or to a residual port, etc.

In accordance with certain preferred embodiments, as mentioned above, the optical multiplexing device may comprise a broadband reflector element, that is, an element which is highly reflective of all wavelengths of the channels which combine to form the multi-channel collimated light, or other means for cascading light within the optical block along a multi-point zig-zag light path from one to another of the optical port, the channel port(s), and the residual port (if any). In certain preferred embodiments, the reflector element is a broadband high reflector positioned at one of the parallel surfaces of the optical block while on the opposite parallel surface of the optical block is an array of channel ports. That is, in accordance with such embodiments, rather than staggering channel ports along both of the two parallel sides of the optical block, all channel ports (and, optionally, also the optical port) are positioned in a linear array at one parallel surface of the optical block, with one or more broadband reflector elements at the opposite parallel surface. In those preferred embodiments mentioned above, employing an optical slot, the interference filters of the channel ports and the reflector element(s) thus span the optical slot on opposite surfaces of the optical block, cooperating to cascade optical signals through the optical slot in the aforesaid multi-point zig-zag light path, i.e., in a multiple-bounce sequence starting at (and/or finishing at) the optical port through which multi-channel collimated light passes. Such broadband reflector element, in a manner analogous to that of a channel port filter element, preferably is adhered to the parallel side of the optical block so as to face the optical slot and lie substantially in the plane of that parallel surface. In a demultiplexing operation, for example, the optical signals would enter the optical block via the optical port and travel along the aforesaid multi-point light path (with or without a first reflection off the broadband high reflector element) to the first channel port (acting in this case as an output port). A first channel is transmitted out of the optical gap through such first channel port, while other wavelengths are reflected back to the reflector element to cascade further along the multipoint light path within the optical gap to one or more additional, downstream channel ports and/or a residual port. It will be understood from this disclosure, that such embodiments employing a reflector element in the optical multiplexing device can operate in either direction (i.e., in the multiplexing or demultiplexing direction) and in accordance with certain highly advantageous embodiments, operate as a bidirectional device both adding and removing channels.

It is to be appreciated that any broadband reflectors and the filter elements of the various channel ports are secured to the optical block preferably in the same manner. Thus, although the following discussion is directed primarily to the interference filters of the channel ports, it relates generally to other reflector elements as well. For ease of fabrication with good precision, the optical block, most typically, is rectilinear, with the aforesaid optical gap extending from a first to a second parallel surface. The interference filter of a channel port is positioned at the surface of the optical block facing the optical gap and, in those embodiments employing an optical slot, as described above, the filter element spans the optical slot. The collimated light thus passes exclusively through the optical gap as it is transmitted between the optical port and multiple channel ports, as it bounces along the multi-point light path. Where the optical gap is a slot, the filter element preferably is sized such that a substantial portion of the filter element is suspended across the slot and only the edges of the filter element contact the optical block to provide a surface area for adhesively securing the filter element to the optical block. The filter element is typically adhered to the optical block with an epoxy or other adhesive. Thus, advantageously, since the adhesive need only be applied in the areas where the filter element contacts the optical block, namely at outer edges of the filter element, light passing through the filter need not also pass through a layer of adhesive. Thus, multiplexing/demultiplexing can be achieved by the devices disclosed here with no "epoxy in the path."

From the foregoing disclosure, it will be readily apparent to those skilled in the art, that is, to those who are knowledgeable or experienced in this area of technology, that the present invention provides a significant technological advance. The optical multiplexing device disclosed here provides an unobstructed path along which collimated light can travel. Through the use of the optical gap and adherence of the interference filter to the optical block only at its outer edges, interference with the light path due to adhesives is reduced or eliminated. These and additional features and advantages of the invention disclosed here will be further understood from the following detailed disclosure of certain preferred embodiments.

BRIEF DESCRIPTION OF THE DRAWINGS

Certain preferred embodiments of the invention are discussed below with reference to the accompanying drawings in which.

Figure 1:
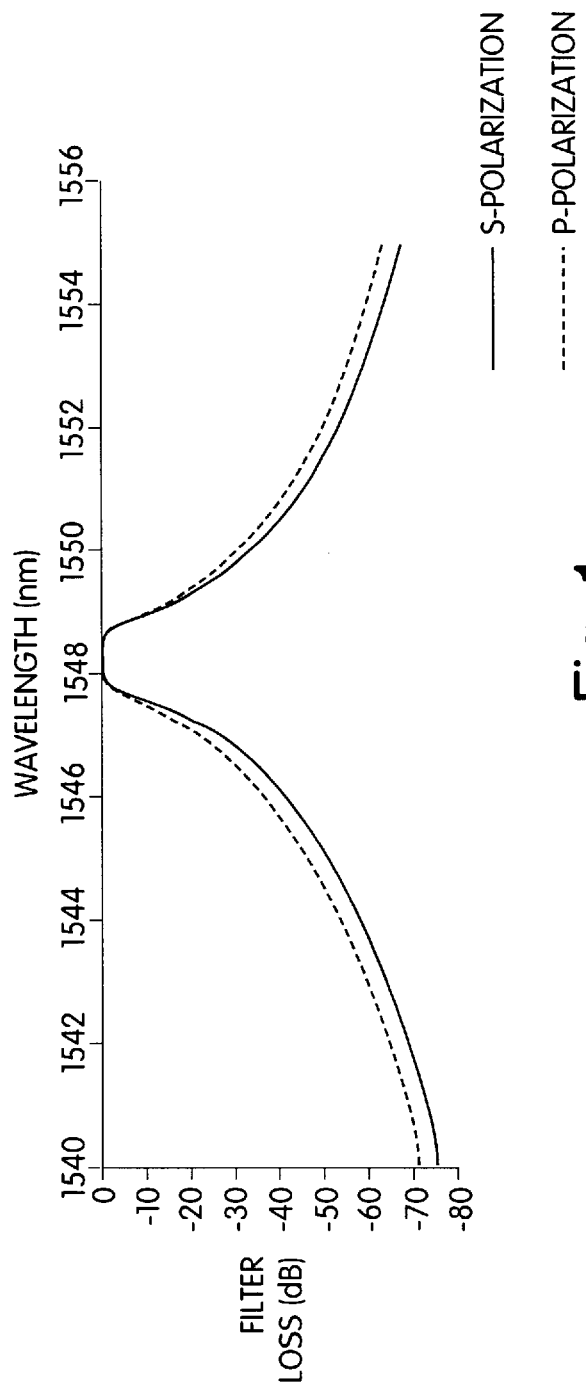
FIG. 1 is a graph showing the theoretical performance of a high quality multi-cavity, dielectric, optical interference filter.

It should be understood that the optical multiplexing devices and interference filters illustrated in the drawings are not necessarily to scale, either in their various dimensions or angular relationships. In particular, the filter element and reflector elements are shown in the plan views with greater thickness than would be used in preferred embodiments, for ease of illustration and viewing. It will be well within the ability of those skilled in the art to select suitable dimensions and angular relationships for such devices in view of the foregoing disclosure and the following detailed description of preferred embodiments.

DETAILED DESCRIPTION OF CERTAIN PREFERRED EMBODIMENTS

The optical multiplexing device, as disclosed above, has numerous applications including, especially, use in fiber-optic telecommunication systems. Optical multiplexing devices of this design are useful also in test equipment and the like, as well as laboratory instrumentation. For purposes of illustration, the preferred embodiments described below in detail are dense channel wavelength division multiplexing devices for a multi-channel fiber-optic telecommunication system, which can solve or reduce the above described problems associated with optical signals traveling through adhesive while achieving mounting of optical filter elements and reflector elements in nearly perfect parallelism in the optical device. The term transparent, when used here means at least substantially transparent to a particular wavelength range or wavelength sub-range, for example, sufficiently transparent to light of a certain channel to effectively transmit or pass that channel in a fiber-optic communication system. Reflective, when used here, means at least substantially reflective of particular wavelength ranges or wavelength sub-ranges. Residual, when used here, generally, refers to collimated light which passes downstream of a last channel port. The residual light may consist of no light, a particular wavelength sub-range, or multiple wavelength sub-ranges.

Figure 2:
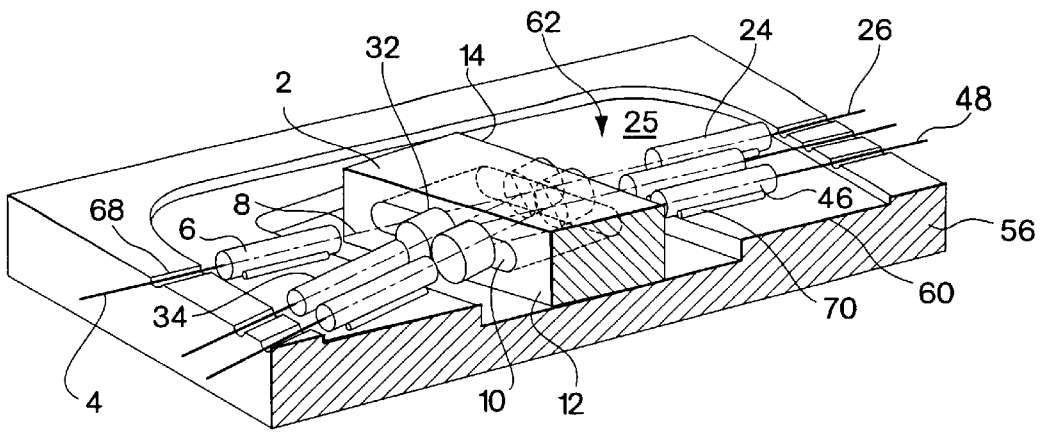
FIG. 2 is a perspective section view of a first preferred embodiment of an optical multiplexing device, shown in a partially assembled condition.

A multiplexing device with a precision optical block is illustrated in FIG. 2. This multiplexing device has the ability to multiplex individual, separate wavelength signals into a common fiber-optic carrier line or other optical waveguide and/or to demultiplex such signals into individual channel carrier lines, sensors or other destination. For simplicity of explanation, the demultiplexing functionality is described here in greatest detail, since those skilled in the art will readily understand the correlative multiplexing functionality. That is, those skilled in the art will recognize that the same device can be employed in reverse to multiplex optical signals from the individual channels. The optical multiplexing device of FIG. 2 comprises an optical block 2 which, preferably, is ceramic, metal (e.g., stainless steel, aluminum, etc.), or any other, preferably non-transparent material. Optical fiber 4, carrying a multi-channel optical signal, communicates with means for projecting collimated light, such as a fiber-optic gradient index ( "GRIN") lens collimator 6 or the like. Collimator 6 couples highly collimated light 8 to the optical block 2 at a slight angle through optical slot 10 which extends through optical block 2 from first surface 12 to second surface 14. Second surface 14 is spaced from and parallel to first surface 12. Optical slot 10 provides an unobstructed path for collimated light 8 to pass through optical block 2 from first surface 12 to second surface 14. The location at surface 12 (i.e., in the plane of surface 12) at which light 8 passes into the optical slot 10 is referred to here as the optical port.

Figure 3:
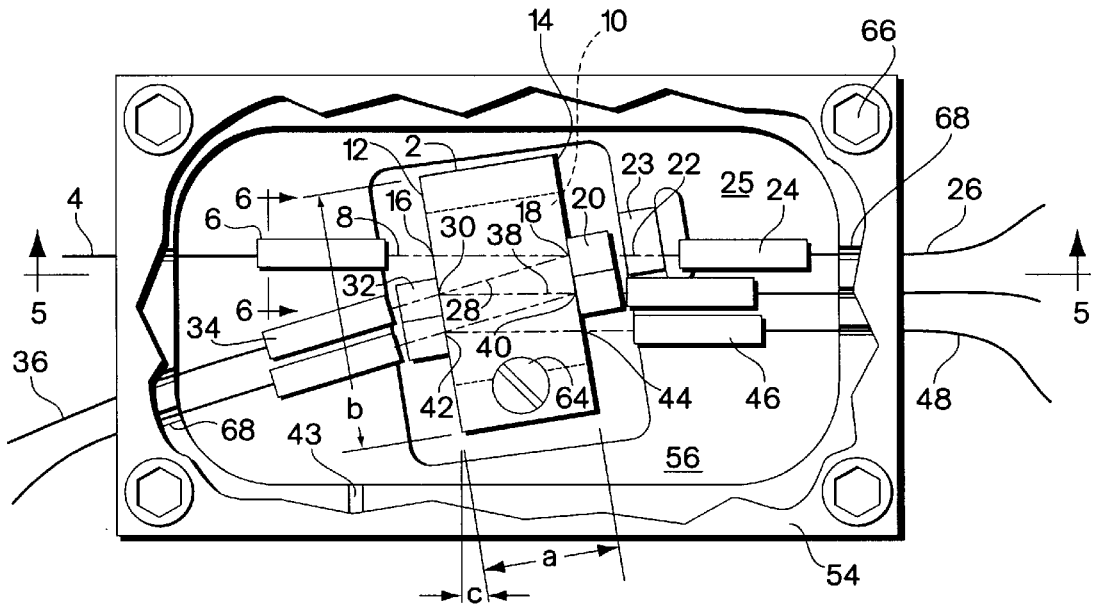
FIG. 3 is a schematic plan view illustration of the embodiment of FIG. 2 together in assembly with a cover plate shown partially cut away.

Turning now to FIG. 3, the path of collimated light 8 through optical block 2 is more clearly illustrated. Exemplary specifications for an optical multiplexing device in accordance with a preferred embodiment as illustrated in FIGS. 2 and 3 include those provided in Table A. In the table below, reference to channel spacing should be understood to mean center-to-center spacing. That is, the channel spacing is measured from the center of the wavelength range of one channel to the center of the wavelength range of the next adjacent channel.

TABLE A

| Number of Channels | 4 |
| --- | --- |
| Channel wavelength | 1533–1557 |
| Channel spacing | 8.0 nm ± 0.2 nm |
| Minimum Isolation | 35 dB |
| Insertion loss (total) | less than 6 dB per channel |
| Fiber type | single mode, 1 meter pigtail |
| Operating temperature range | 0° C. to +70° C. |

In accordance with one preferred embodiment, the optical block has a height (normal to the plane of the paper in FIG. 3) of 0.225 inch, a width of 0.425 inch, and a length of 0.850 inch. The collimated light preferably has a divergence of not more than about 0.15°, and the tilt angle "c" at which the collimated light enters the optical block 2 is about 5° to 10°, preferably about 6° to 8°, e.g., 7°. Larger tilt angles result in disadvantageously high PDL, as discussed above. Smaller tilt angles require greater distance between the two parallel surfaces 12, 14 of optical block 2 to achieve adequate spacing between adjacent points of the zig-zag light path. Thus, multicolor, multi-wavelength, or multi-channel light carried by optical fiber 4 (preferably a single mode fiber) is collimated by collimator 6 and directed through optical port 16 at first surface 12 of the optical block 2, whence it passes through optical slot 10, within the optical block 2, to second surface 14.

Light entering the optical block 2 at optical port 16 passes through optical slot 10 to channel port 18 at second surface 14. Filter 20, located at channel port 18, is transparent to a sub-range of the wavelengths included in the collimated light 8. Specifically, light 22 passes through channel port 18 of the optical block 2 to a post-filter 23 and from there to a collimator 24 associated with a first signal channel carrier. Specifically, the optical signal passed by channel port 18 is transmitted to an optical fiber, preferably single mode fiber 26, as a demultiplexed signal. Post-filter 23 is non-coherently coupled to filter 20. Preferably it is free-space aligned during adhesive bonding or other assembly technique to floor surface 25 of lower portion 56 of housing 52, discussed further below. Vent 43 is provided in optical block 2 for venting during thermal curing preferably is subsequently closed, e.g., by a removable screw. Free-space alignment can be performed with a test signal of proper wavelength passed through filter element 20 and post-filter 23 during assembly. The post-filter is turned to adjust its effective optical thickness in order to achieve the proper bandpass center wavelength. This is done, e.g., before an adhesive bond to surface 25 sets and fixes its position relative filter element 20. Such post-filter may be used advantageously to achieve better signal isolation. Accordingly, a post-filter may be used at each channel port. Optionally, for reduced cost and complexity, such post-filter is not used at channel ports at which a signal is injected into the optical slot. Similarly, a post-filter optionally is not used at a terminal channel port, (e.g., the most downstream channel port in a device as disclosed here used in a demultiplexing mode), where all wavelengths other than the desired wavelength(s) of that channel port already have been removed from the multi-channel light at previous (i.e., upstream) channel ports. The signal isolation achieved by a single high performance filter element typically will be adequate given virtually complete removal of out-of-band wavelengths by previous channel ports. Given the benefit of this disclosure, it will be within the ability of those skilled in the art to employ post-filters, such as post-filter 23 at the first channel port in the embodiment of FIGS. 2 and 3, as appropriate for channel ports, etc. in the multiplexing devices disclosed here.

The filter 20 at channel port 18 is reflective of wavelengths which are not "in-band" of the filter. This reflected light 28 is reflected from filter 20 at second surface 14 of the optical block 2 back to a second channel port 30 at first surface 12. Interference filter 32 at channel port 30 is transparent to a different wavelength or sub-range of wavelengths than is filter 20 at channel port 18. For dense channel wavelength division multiplexing applications, the wavelength separation between each of the multiple channel ports linearly spaced along first and second surfaces 12 and 14 is set to fit within the EDFA spectral bandwidth of approximately 40 nm from about 1527 nm to 1567 nm. Thus, typical channel spacing is, e.g., 8 nm for a four channel system using the entire EDFA bandwidth. Thus, at channel port 30 an optical signal corresponding to a second channel is transmitted through the filter 32 to a collimator 34 and from there to fiber-optic carrier 36. As at the first channel port 18, the filter 32 at channel port 30 reflects light which is not in-band. Thus, the remaining portion 38 of the collimated light 8 which first entered the optical block 2 at optical port 16 is reflected back from port 30 to a third channel port 40 at second surface 14. Continuing this process in similar fashion, at channel port 40 the light is partially passed and partially reflected or bounced back to a fourth channel port 42 at first surface 12, where it is then partially passed and partially reflected to residual port 44 at second surface 14. At each of the ports 40 and 42, the light is partially reflected by an associated filter and partially passed to an associated collimator, each collimator communicating with a corresponding signal carrier line or signal detector or other destination. Residual port 44 is preferably a region or area where the remaining light (reflected by the interference filter at channel port 42) exits slot 10 and then passes to a collimator 46 and on to fiber-optic carrier 48. It is to be appreciated that residual port 44 need not be located at second surface 14, but may be located at first surface 12, e.g., in place of channel port 42.

The reflected wavelengths therefore cascade in a zig-zag along a multi-point light path through the optical slot 10 in the optical block 2, with the optical signal for each individual channel being removed by successive bounces at first and second surfaces 12 and 14 until any residual light reaches residual port 44. Quite significantly, in preferred embodiments the light passes through only air and a single interference filter, with no epoxy or other adhesive in the optical path, in entering, passing through and exiting the optical block. In preferred embodiments, the loss for each channel in substantially equal, as all filter elements are within the Rayleigh range of the collimating optics.

While preferably the interference filter at each channel port is reflective of all wavelengths which are not in-band of that channel port, in certain applications it would need be reflective only of the wavelengths of optical signals which had not been extracted at upstream channel ports, that is, at channel ports encountered previously along the multipoint light path. Also, those skilled in the art will understand from this description that the optical multiplexing device of FIG. 2 is equally suitable for use in combining optical signals, such as optical signals from the individual ports 18, 30, 40, 42 and 44. Thus, the residual port 44 and the multiple channel ports in first and second surfaces 12 and 14 would be input ports, and optical port 16 would be an output port. The cascading would then proceed downstream in optical slot 10 from the bottom (as viewed in FIG. 3) of the optical block 2 toward the top.

Those skilled in the art, that is, those who are knowledgeable and experienced in this field of technology, will appreciate that the optical multiplexing device disclosed here is a significant technological advance. The optical slot 10 provides a light path which is free from obstructions. The unobstructed path provides better performance, including reduced polarization effect. This has even greater significance as the angle at which the light enters the optical block 2 increases. It will be understood from the disclosure here, that alternative suitable embodiments are possible for the optical gap. That is, rather than being configured as slot 10, it could be provided, for example, a series of through-holes drilled (or otherwise formed in the optical block) in the direction of the several "bounces" or segments of the zig-zag light path from one side of the optical block to the other. The filter elements in certain such embodiments would be adhered to the optical block over the holes. Alternatively, the optical gap can be formed simply above a surface of the optical block between two parallel sides. In that case, the filter element of the channel ports and any other reflective elements used can each extend to a free end from an opposite end adhered to the proper parallel side of the optical block. The filter elements would in certain such embodiments extend like two fences facing each other across the optical gap. Other suitable alternative configurations for the optical block, and optical gap will be apparent to those skilled in the art given the benefit of this disclosure.

Figure 4:
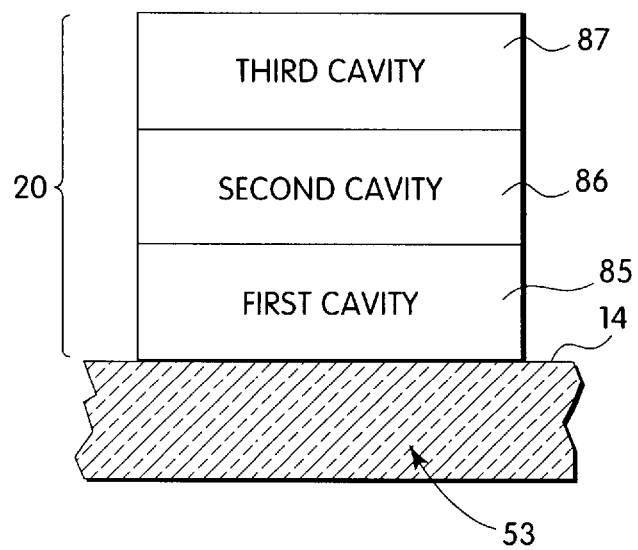
FIG. 4 is an enlarged, schematic section illustration of a three cavity interference filter of the optical multiplexing device of FIG. 2.

The film stack structure for the interference filters in the preferred embodiment illustrated in FIG. 2 is illustrated in FIG. 4. Preferably, the filter element of each channel port has a high performance, all-dielectric, narrow bandpass interference filter formed on an optical substrate, e.g., by sputtering or other suitable deposition technique, such as those of the Scobey et al patent mentioned above. The surface of the optical substrate carrying the deposited filter preferably is placed facing into the optical gap extending between the plane of two parallel surfaces of the optical block. The filter is preferably a multi-cavity, most preferably three to five cavity, film stack coating modeled after a Fabry-Perot interference filter, and may be referred to here simply as a cavity filter or an interference filter. In accordance with known technology, two dielectric thin film stacks which by themselves form a reflector for the optical wavelengths in question, are separated by a thicker cavity layer. This structure is then repeated one or more times to produce a filter with enhanced blocking and improved in-band transmission flatness, such as shown in FIG. 1. The net effect is to produce a narrowband filter where in-band light is transmitted and out-of-band light is reflected. As noted above, dichroic filters may also be used. In preferred three-cavity embodiments produced by the deposition techniques mentioned above, high performance filter elements are formed, having dense, stable metal oxide film stacks with excellent thermal stability. Such multi-cavity filters provide performance characteristics which are commercially acceptable for dense channel wavelength division multiplexing for fiber-optic telecommunications applications of the optical multiplexing devices disclosed here. Specifically, for example, low cross-talk between channels and a suitably high number of channels within a given bandwidth can be achieved. An excessive number of cavities will adversely affect the transmissivity of even in-band wavelengths and may increase production costs for the optical multiplexing device beyond commercially acceptable levels. Preferably, the thickness of each alternating layer of the film stack forming the filter (for example, of niobium pentoxide and silicon dioxide), as well as the total thickness of the film stack, is precisely controlled, most preferably within 0.01% or 0.2 nm over the area of the filter. In addition, the film stack should be deposited with very low film absorption and scatter, and with a bulk density near unity to reduce water-induced filter shifting. Such ultra-narrow, multi-cavity bandpass filters have excellent performance characteristics including: temperature and environmental stability; narrow bandwidth; high transmittance of the desired optical signal and high reflectance of other wavelengths, that is, highly selective transmissivity (particularly in designs employing three cavities or more); and relatively low cost and simple construction. As shown in FIG. 4, the preferred filter is a three cavity filter, wherein one cavity, the "first cavity" 85, is immediately adjacent an optical substrate. A second cavity 86 immediately overlies the first cavity 85 and the third cavity 87 immediately overlies the second cavity 86. As noted above, preferably the surface of optical substrate 53 which carries the film stack faces into the optical slot, such that light reflected by the filter need not travel through the substrate. Further description of suitable multi-cavity filters is provided in *Thin Film Optical Filters* (2 Ed, 1986), H. A. MacLeod (published by MacMillan Publishing Company), the entire disclosure of which is incorporated herein by reference.

In a preferred embodiment employing multiple filter elements, a matched set of filter elements is used. That is, each of the filters used on optical block 2 is transparent to a wavelength sub-range which varies from its particular specified or desired wavelength sub-range by an equal amount. This uniform error can then be corrected by tilting the optical block carrying the filter elements, that is, tilting it relative to the beam of light entering at the optical port. Thus, the angle at which collimated light 8 enters optical block 2 is adjusted by tilting optical block 2 (i.e., by rotating optical block 2 in FIG. 3 clockwise or counterclockwise in the plane of the paper) to slightly shift the angles of incidence and reflection as the light bounces back and forth in the optical slot. Typically, such adjustment is less than 1°, more preferably less than 0.5°. Such tilting compensates for the matched variation from the desired wavelength sub-ranges at the channel ports by changing the effective or optical thickness of the film stacks forming the filters. Thus, by grouping filters into matched filter sets in this manner, a single adjustment to the optical block 2 can correct for the variation of all filters simultaneously.

Figure 5:
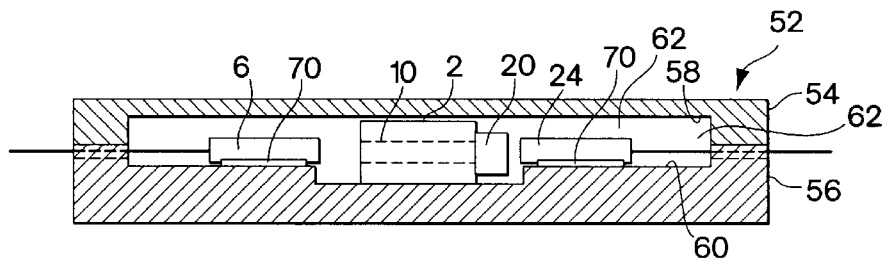
FIG. 5 is a schematic section illustration of the optical multiplexing device of FIG. 3 taken along section line 5—5.

Referring now to FIG. 5, the embodiment of FIGS. 2–4 is shown with a closed housing 52. Specifically, housing 52 is seen to comprise upper portion 54 and lower portion 56. Upper recess 58 in upper portion 54 and mating lower recess 60 in lower portion 56 combine, when upper portion 54 is joined to lower portion 56, to form chamber 62 in which optical block 2 is positioned. Optical block 2 is secured to housing 52 to prevent movement of the optical block via any known fastening means, such as screw 64 (shown in FIG. 3). Upper portion 54 and lower portion 56 are securely fastened to one another by known fastening means, such as bolts 66 (shown in FIG. 3). Preferably, housing 52 is substantially hermetically sealed, and is at least free of air gaps which would allow contaminants to enter chamber 62 and affect the operation of the optical multiplexing device. As noted above, vent hole 43 can be closed after thermal curing of adhesive used in the device, including adhesive optionally used to seal together the upper and lower parts of the housing. As can also be seen in FIG. 2, channels 68 are formed in lower portion 56, sized to accommodate the fiber-optic carriers and sealingly engage the same. It is to be appreciated that although the channels are shown solely in lower portion 56, they may be formed in upper portion 54 or in both upper and lower portions 54, 56. Chamber 62 may contain air, or other optically transparent gas, and also may be vacuum sealed.

Figure 6:
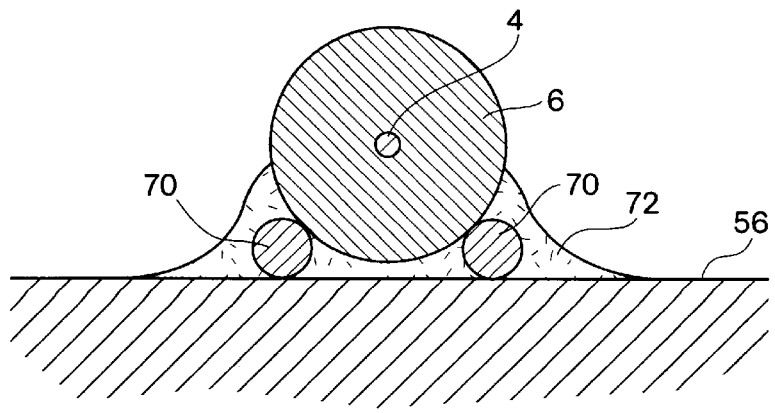
FIG. 6 is an enlarged schematic section illustration of a collimator and spacer wires of the optical multiplexing device of FIG. 3 taken along section line 6—6.

As can be more clearly seen in both FIGS. 5 and 6, collimator 6, as is each of the other collimators, is spaced from the surface of lower portion 56 by a pair of wire spacers 70. Spacers 70 are placed coaxially with and along a surface of collimator 6 between the surface of lower portion 56 and collimator 6. Adhesive material 72, e.g., epoxy is disposed along the surface of lower portion 56, spacers 70 are positioned along lower portion 56 within epoxy 72, and collimator 6 is positioned on spacers 70, thus insuring that collimator 6 is aligned, elevated and parallel to the surface of lower portion 56. Epoxy 72 is preferably Epotek 353™ produced by Epoxy Technology, Inc., Billerica, Mass. USA, or other suitable adhesive, such as are commercially available and known to those skilled in the art.

Figure 7:
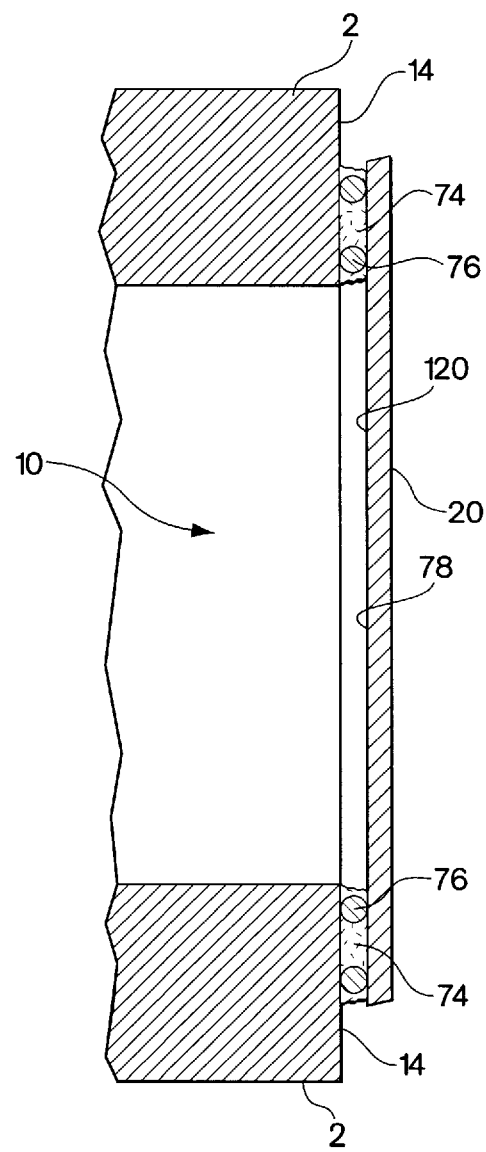
FIG. 7 is an enlarged schematic section illustration, partially broken away, of an interference filter of the optical multiplexing device of FIG. 3 adhered to the optical block with adhesive containing spacer beads.

It is important that the filter elements of the multiplexing devices disclosed here be aligned properly in order to transmit desired wavelength sub-ranges of light and accurately reflect other wavelengths. In order to accomplish this, the first and second surfaces 12, 14 of optical block 2, as seen in FIG. 3, are manufactured such that they are as close as reasonably possible to perfectly parallel. Thus, the optical block preferably is machined out of a single, unitary block, e.g., of 304 stainless steel, with surfaces 12 and 14 diverging from each other at an angle no greater than about 0.02°, more preferably no greater than about 0.005°. To further insure proper alignment of the multi-point light path, the interference filters must be secured to the optical block 2 in an accurate and precise manner. As noted above, the surface of an optical substrate which carries the film stack is positioned against the optical block. This has the further advantage of avoiding any tilting of the film stack due to uneven thickness of the optical substrate. Referring to FIG. 7, filter element 20 is seen to comprise a flat or mono-planar optical substrate disposed across optical slot 10 and secured to second surface 14 of optical block 2 such that a substantial portion is suspended across optical slot 10. The outer edges of filter element 20 are positioned against surface 14. Surface 78 of filter element 20 carries the film stack 120 which forms the interference filter. Filter element 20 is adhered to optical block 2 with adhesive 74. Adhesive 74 can be, for example, Epotek 353™ mentioned above, or any other material suitable for adhering filter 20 to optical block 2. Spacer beads 76 (shown greatly enlarged for purposes of illustration) are disposed, or contained, within adhesive 74. Suitable spacer beads preferably are spherical, being 20 microns or less in diameter, more preferably, 5 microns or less. Such spacer beads are commercially available, including, e.g., 5 micron silica beads or microspheres available from Bangs Laboratories (Fiskins, Indiana, USA). As filter 20 is pressed onto optical block 2, the adhesive 74 is compressed and/or displaced until filter 20 and optical block 2 contact opposite sides of beads 76. When a mono-layer of the beads 76 are in contact with both filter 20 and optical block 2 both above and below optical slot 10, surface 78 of filter 20 is parallel to second surface 14 of optical block 2. Beads 76 are preferably formed of silica or any other suitable material. Beads 76 are preferably microspheres of substantially uniform diameter between about 3 microns and about 20 microns and more preferably are about 5 microns in diameter. Thus, by the use of such mono-layer of microspheres 76 in the adhesive interface, and the fact that the filter-carrying surface faces the optical block, the filters are kept parallel to the precision surfaces 12, 14 of optical block 2. In certain exemplary embodiments, silica microspheres of about 5 microns diameter are used in epoxy adhesive in an amount of 1% or less by weight. Where separate filter elements or other reflective elements are adhered to one side of the optical block to establish channel ports and/or one side of the multi-point zig-zag light path through the optical block, preferably they are slightly spaced from each other. This is especially preferred in embodiments where such adhered elements are rectangular or square and are adhered to the optical block next to each other in a linear array. Preferably such side-by-side elements have at least about .1mm gap or space between them, more generally, the space should be sufficient to substantially prevent the adhesive from wicking or traveling by capillary-type action into the space between the adjacent reflective elements.

By mounting the filters to the optical block 2 in such manner, the light path is free of any adhesive which would affect the optical signal. (That is, in common parlance, there is no epoxy in the path.) Since the filters are positioned to span the optical slot 10 and adhesive 74 is only applied along the outer edges of the filters, the optical signal does not pass through the adhesive. It is to be appreciated that broadband reflectors preferably are adhered to the optical block 2 in the same manner and therefore realize this same advantage. Thus, preferred embodiments of the multiplexing devices disclosed here achieve an epoxy-free light path together with precision parallelism between the filter elements and other reflective elements adhered to the parallel opposite sides of the optical block to define the multipoint zig-zag light path through the optical gap. This is highly important to achieving narrow channel spacing for dense wavelength division multiplexing, especially since errors in parallelism accumulate with each light bounce through the optical gap. For example, an angle error of only 0.02° in the parallelism of the reflective and selectively reflective elements defining the light path through the optical gap can yield 0.12 nm passband wavelength error after four bounces. Typically, in high performance DWDM devices of the type disclosed here, the passband of a filter element is about 60 to 70% of center-to-center spacing between adjacent channels. Therefore, especially for multiplexing devices having 2 nm channel spacing for example, it is highly important that parallelism of the reflective elements be within 0.02° angle error. The use of high performance filters with such precision parallelism in preferred embodiments disclosed here achieves passband transmission accuracy not previously achieved. The Nosu et al devices discussed above, for example, had lower performance characteristics and adhered filter elements to transparent glass blocks which typically are available with opposite sides "parallel" to each other only to within about one or more tenths of a degree. This lack of precision parallelism could be tolerated in those prior devices since those devices did not use high performance filters and had channels of, e.g., 40 nm bandwidth. In contrast, preferred embodiments disclosed here, as discussed above, achieve parallelism to within less than two hundredths of a degree, more preferably to within less than about 5 thousandths of a degree. Optical blocks as disclosed here can be precision machined from 304 stainless steel, for example, to have parallel opposite surfaces defining the optical slot (or other optical gap configuration) with parallelism to within less than 0.02°, preferably less than 0.005°. As noted above, the filter-carrying side of the mono-planar optical substrate of the channel port filter elements, and likewise the coated surface of any other reflective elements adhered to the optical block to define the multipoint zig-zag light path, preferably face into the optical slot. Any slight non-parallelism of the filters and broadband reflectors of the optical substrate, therefore, does not adversely affect the precision parallelism of the multiplexing device. Nevertheless, the coated surface and the opposite side surface of the optical substrate, e.g., the optical substrate of filter element 20 in FIG. 7, preferably are parallel to each other to within about 0.1° of angular wedge. Employing the above-described adhesive mounting technique for the filter elements and any other reflective elements, with a monolayer of microspheres as spacer beads between the coated surface of the reflective elements and the precision parallel surfaces of the optical block, together with high performance filters as described above, provides the exceptionally good performance of various preferred embodiments disclosed here, including ultra-narrow channel spacing (e.g., center-to-center spacing of 2 nm, 1 nm or even less).

Figure 8:
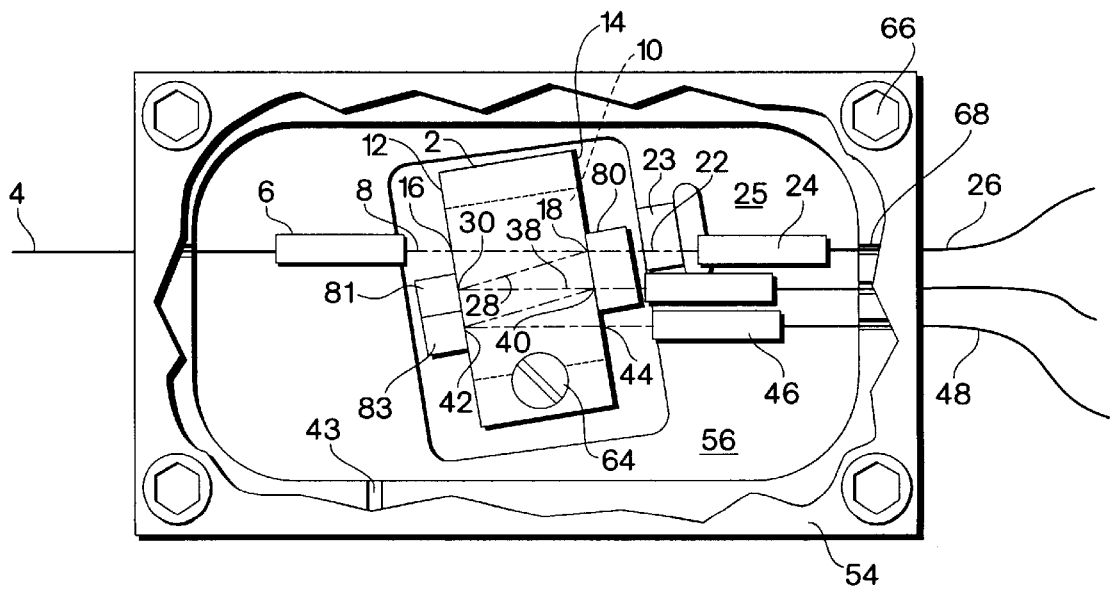
FIG. 8 is a schematic plan view illustration of another preferred embodiment of the optical multiplexing device of FIG. 2 having a continuous, variable thickness filter element opposite a linear array of broadband reflector elements.

Another preferred embodiment is shown in FIG. 8. A single variable thickness, multi-cavity interference filter element 80 is provided on surface 14 to provide filtering at channel ports 18 and 40. The film stack extending on a unitary optical substrate of filter element 80 has a different optical thickness at the location of channel port 18 than it does at the location of channel port 40. The optical thickness of filter 80 preferably is continuously variable from top to bottom (as viewed in FIG. 8). Most preferably, the film stack thickness is substantially linearly variable. Reference to the thickness of the continuously variable filter element 80 should be understood to mean its optical thickness unless other specified or otherwise clear from the context. Thus, it is transparent to different wavelength sub-ranges at different locations along its length. Specifically, in the embodiment of FIG. 8, filter element 80 is transparent at channel port 18 to a different sub-range of wavelengths than it is at channel port 40. Filter 80 is transparent at channel port 18 to one sub-range of wavelengths included in the collimated light 8. Such first sub-range of light 22 passes through channel port 18 to collimator 24 and single mode fiber 26 as in the embodiment shown in FIG. 3. The continuous filter 80 at channel port 18 is reflective of wavelengths that are not "in-band" of the filter at that location. The light 28 reflected back again through the optical slot by continuous filter 80 at first channel port 18 strikes broadband high reflector 81 in the plane of surface 12. There it is reflected again through the optical slot further along light path 38 to channel port 40 in the plane of surface 14. At channel port 40 the continuous, variable thickness, multi-cavity interference filter 80 is transparent to a different wavelength or sub-range of wavelengths than it is at channel port 18. The remaining light not transmitted there is reflected by filter 80 again back through optical slot 10 to reflector 83 at first surface 12 which, in turn, again reflects all wavelengths of the light back to residual port 44 at surface 14. Variable thickness filters suitable to be employed in the embodiment of FIG. 8 are more completely described in U.S. Pat. No. 5,583,683 to Scobey, the entire disclosure of which is incorporated herein by reference.

Figure 9:
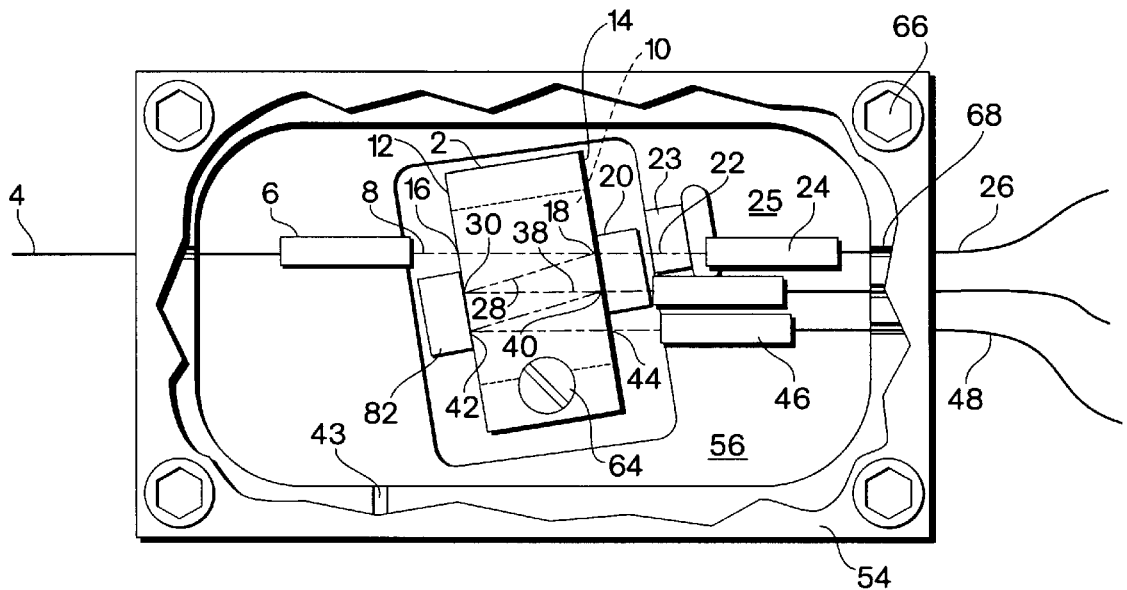
FIG. 9 is a schematic plan view illustration in accordance with an alternative preferred embodiment of the multiplexing device of FIG. 8 having a reflective film along one surface.

Another preferred embodiment is shown in FIG. 9, being like that of FIG. 8 except that first surface 12 carries a single, unitary broadband high reflector element 82 rather than the individual reflectors 81, 83 of the embodiment of FIG. 8. The reflected light 28 from the first channel port 18 is reflected at first surface 12 by reflector 82 as remaining light 38 back to second surface 14 of the optical block 2 at channel port 40. Wavelengths not transmitted by channel port 40 are then reflected back to reflector 82 at first surface 12 where they reflect back to residual port 44 at second surface 14. The remaining light therefore cascades along the multi-port light path alternately bouncing off of the interference filters and the reflector 82.

Figure 10:
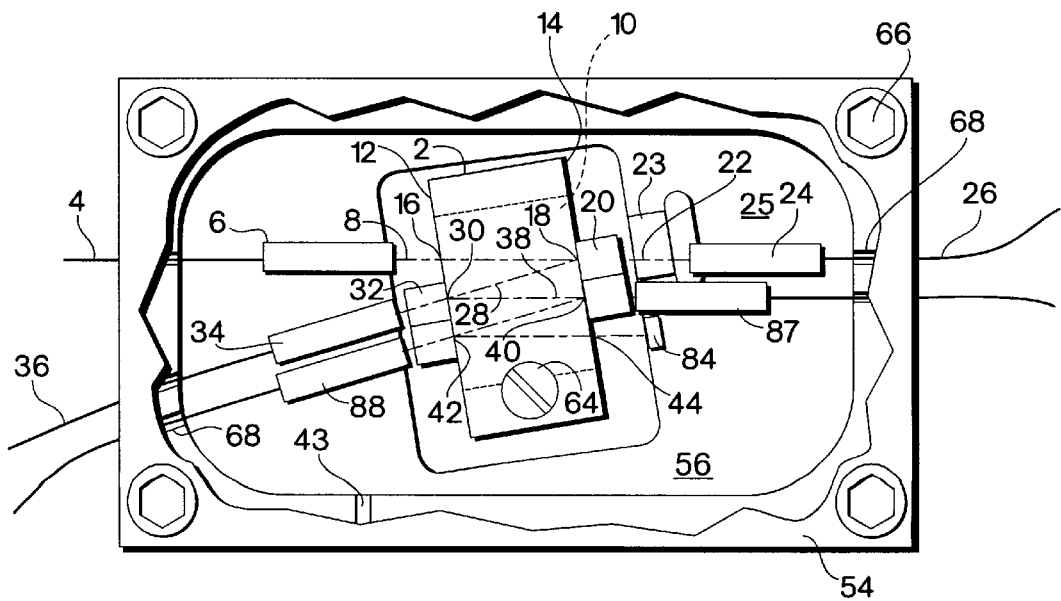
FIG. 10 is a schematic plan view illustration of the embodiment of FIG. 3 shown with an end cap at the residual port.

Another preferred embodiment in shown in FIG. 10. End cap 84 for residual port 44 may optionally be provided to prevent transmission of any light out of the optical block at that port. End cap 84 alternatively can be provided at any of the channel ports, and is preferably removable so as to provide future expansion by adding a filter, reflector, or other components in its place.

It is to be appreciated that in the above-discussed embodiments, the number of channel ports may be greater or less than four, depending upon the application, and design parameters. In particular, a filter tap embodiment, e.g., for selectively removing a single channel from a multi-channel fiber-optic trunk line, may comprise a signal channel port comprising a filter element (optionally with a post-filter) secured to the optical block spanning the optical slot. The remainder of the multi-channel light would be reflected back through the optical slot (one or more times) to the trunk line. Also, as discussed above, the multiplexing device can operate bidirectionally. In a bidirectional mode the embodiment of FIG. 10, for example, can be used to inject one channel through channel port 40 and another channel through channel port 42. Channels can be removed through channel port 18 and channel port 30. In such mode, filter element 42 may be removed without adverse consequence if no light enters at port 44. That is, if the multi-channel light 8 fed into the optical slot 10 via optical port 16 has only the two channels to be removed (one each) at channel ports 18 and 30, then in a preferred, high performance embodiment substantially no signal would travel downstream along the zig-zag light path beyond channel port 30 to channel port 42. Thus, no light need be reflected at port 42. The signal injected at channel port 42 travels to channel port 40, where it is reflected back toward channel port 30 together with the signal injected at channel port 40. The multiplexed light from ports 40 and 42 travels upstream away from channel port 42 along the light path through the optical slot 10, eventually to optical port 16 and thence to trunk line 4 in accordance with the principles disclosed above. Because each channel port with a selectively transparent filter element reflects other wavelengths, in and out channels can be arranged in any desired sequence along the optical slot. Thus, it is not necessary that all channel ports injecting a channel into the optical slot be at one end of the optical slot, and all channel ports passing a channel out of the optical slot be at the other end (as, for example, in the embodiment discussed just above with reference to FIG. 10). Rather, in and out channel ports can be interspersed with each other to provide significant design flexibility and performance advantages. It will be within the ability of those skilled in the art, given the benefit of this disclosure and discussion of various preferred embodiments, to design other monodirectional and bi-directional multiplexing devices in accordance with the present invention.

In certain preferred embodiments of the multiplexing device disclosed here, the coefficient of thermal expansion of the optical block matches that of the optical substrate used in the filter elements and other reflective elements (if any) adhered to the optical block. Employing an optical block which expands and contracts with changing temperature at the same or approximately the same rate as the optical substrate of the filter elements provides substantially improved durability for the multiplexing device. That is, tension and compression stress is avoided at the adhesive interface between the optical block and the filter element by matching their coefficients of thermal expansion. In especially preferred embodiments the difference between the coefficient of thermal expansion of the optical block and the coefficient of thermal expansion of the optical substrate in less than about $10 \times 10^{-6}$ per ° C., more preferably less than $5 \times 10^{-6}$ per ° C. Those skilled in the art will understand that the coefficient of thermal expansion of the optical block must be selected in concert with achieving other necessary or desirable material properties, such as weldability, etc. In this regard, the optical block and the housing for the multiplexing device preferably have matched coefficience of thermal expansion. This is, of course, easily achieved by choosing the same material for both the housing and the optical block. In one highly preferred embodiment, the optical substrate is optical glass WG320, available from Schott Glas Werke (Mainz, Germany) having a coefficient of thermal expansion of approximately $9.1 \times 10^{-6}$ per ° C. This preferred optical glass is used together with an optical block formed of 304 stainless steel having a coefficient of thermal expansion of approximately $17.3 \times 10^{-6}$ per ° C. Thus, the difference in their coefficient of thermal expansion is about $8 \times 10^{-6}$ per ° C. This differential, for a filter element which is 3 mm×5 mm and 2 mm thick, over a 100° C. temperature range, yields a maximum difference in linear expansion at the adhesive interface with the optical block of only about 4 microns. In accordance with preferred embodiments of the multiplexing device disclosed here, it is well within the elasticity of the filter element, adhesive and optical block to tolerate this small difference in linear expansion without significant degradation of the adhesive even over prolonged service life. That is, as explained above, the close matching of the coefficients of thermal expansion of the optical block and the optical substrate substantially reduces or eliminates thermally induced stress at the adhesive interface between the filter element and the optical block, resulting in improved long term durability for the multiplexing device. In accordance with certain embodiments of the multiplexing device disclosed here, the coefficient of thermal expansion of the optical substrate wholly or partly offsets the intrinsic thermal wavelength shifts of the film stack which forms the Fabry-Perot interference filter of the filter element. The stretching (or compression) of the film stack by the optical substrate in response to a temperature change wholly or partially offsets the change in refractive index and volumetric distortion of the film stack as a result of such temperature change.

It will be apparent from the above discussion that various additions and modifications can be made to the optical multiplexing devices described here in detail, without departing from the true scope and spirit of this invention. All such modifications and additions are intended to be covered by the following claims.

We claim:

1. An optical multiplexing device for multi-channel collimated light, comprising, in combination:
    an optical block having first and second surfaces, the first surface lying in a first plane and the second surface lying in a second plane spaced from and parallel to the first plane, defining an optical gap between the first and second planes;
    an optically transparent optical port means in optical communication with the optical gap;
    a channel port comprising a selectively optically transparent first filter element secured to the optical block in the first plane; and
    a reflective element secured to the optical block in the second plane, the optical port, first filter element and reflective element cooperatively defining at least a portion of a multi-point zig-zag light path through the optical gap.

2. The optical multiplexing device of claim 1 having at least a second channel port comprising a selectively optically transparent second filter element secured to the optical block, wherein the first channel port injects a channel of collimated light into the optical gap and the second channel port passes a channel of collimated light out of the optical gap.

3. The optical multiplexing device of claim 1 further comprising, in the first plane, a continuously variable filter element secured to the first surface of the optical block and selectively optically transparent to different wavelength sub-ranges at different points along the multi-point zig-zag light path, the first filter element of the first channel port being a first area of the continuously variable filter element.

4. The optical multiplexing device of claim 1 wherein the reflective element is a broadband reflector.

5. The optical multiplexing device of claim 4 wherein the broadband reflector is a unitary reflector element extending in the second plane to multiple points of the multi-point zig-zag light path.

6. The optical multiplexing device of claim 1 wherein the reflective element is a second filter element of a second channel port which is selectively optically transparent to a wavelength sub-range different from the first filter element.

7. The optical multiplexing device of claim 6 further comprising a third channel port comprising a selectively optically transparent third filter element secured to the optical block in the first plane adjacent the first filter element, and a fourth channel port comprising a selectively optically transparent fourth filter element secured to the optical block in the second plane adjacent the second filter element.

8. The optical multiplexing device of claim 1 further comprising non-selectively optically transparent residual port means in optical communication with the optical gap.

9. The optical multiplexing device of claim 8 further comprising an optically non-transparent end cap blocking optical transmission through the residual port.

10. The optical multiplexing device of claim 1 wherein the first channel port further comprises a post-filter for further isolating in-band transmission through the first filter element, the post-filter being non-coherently optically coupled to the first filter element.

11. The optical multiplexing device of claim 1 wherein the optical port is in optical communication with an optical waveguide trunk line carrying multi-channel light and at least one channel port is in optical communication with an optical waveguide branch line for a selected wavelength sub-range of the multi-channel light.

12. The optical multiplexing device of claim 1 wherein the channel port is in optical communication with an infrared light detector.

13. The optical multiplexing device of claim 1 wherein the filter element comprises a Fabry-Perot interference filter film stack on an optical substrate, the coefficient of thermal expansion of the optical block being substantially equal to the coefficient of thermal expansion of the optical substrate.

14. The optical multiplexing device of claim 1 wherein the filter element comprises a Fabry-Perot interference filter film stack on an optical substrate, the coefficient of thermal expansion of the optical block being within $10 \times 10^{-6}$ per $°$ C. of the coefficient of thermal expansion of the optical substrate.

15. The optical multiplexing device of claim 1 wherein the filter element comprises a Fabry-Perot interference filter film stack on an optical substrate, the coefficient of thermal expansion of the optical block being within $5 \times 10^{-6}$ per $°$ C. of the coefficient of thermal expansion of the optical substrate.

16. The optical multiplexing device of claim 1 wherein the optical gap is an optical slot through a non-optically transparent rectilinear optical block.

17. The optical multiplexing device of claim 1 wherein the filter element comprises a Fabry-Perot interference film stack on a first surface of an optical substrate, the film stack and first surface facing the optical gap.

18. The optical multiplexing device of claim 1 wherein the first surface and the second surface are parallel to each other within 0.02 degrees.

19. The optical multiplexing device of claim 18 wherein the first filter element and the reflective element each is secured to the optical block by epoxy adhesive comprising a mono-layer of spacer beads.

20. The optical multiplexing device of claim 19 wherein the spacer beads are microspheres having a diameter less than 20 microns.

21. An optical multiplexing device for multi-channel collimated light, comprising, in combination:
    an optical block having first and second surfaces, the first surface lying in a first plane and the second surface lying in a second plane spaced from and parallel to the first plane, defining an optical gap between the first and second planes;
    an optically transparent optical port means in optical communication with the optical gap;
    first-side channel ports each comprising a selectively optically transparent filter element in the first plane adhered to the first surface of the optical block; and
    second-side channel ports each comprising a selectively optically transparent filter element in the second plane adhered to the second surface of the optical block, the first-side channel ports and the second-side channel ports cooperatively defining between them a multi-point zig-zag light path through the optical gap.

22. An optical multiplexing device for multi-channel collimated light, comprising, in combination:

an optical block having first and second surfaces, the first surface lying in a first plane and the second surface lying in a second plane spaced from and parallel to the first plane, defining an optical gap between the first and second planes;

optically transparent optical port means in optical communication with the optical gap;

multiple channel ports defined by linearly spaced locations of a continuously variable filter element adhered to the first surface of the optical block, the continuously variable filter element being selectively optically transparent to different wavelength sub-ranges at each of the spaced locations; and a unitary broadband reflector element adhered to the optical block in the second plane, the continuously variable filter element and the unitary broadband reflector element cooperatively defining between them a multi-point zig-zag light path through the optical gap.

23. The optical multiplexing device of claim 22 wherein at least one channel port further comprises a post-filter non-coherently optically coupled to the respective location of the continuously variable filter element.

24. The optical multiplexing device of claim 22 wherein multiple channel ports each further comprises a post-filter non-coherently optically coupled to the filter element and multiple channel ports have no post-filter.

25. The optical multiplexing device of claim 22 wherein each filter element comprises a Fabry-Perot interference filter film stack on an optical substrate, the coefficient of thermal expansion of the optical block being substantially equal to the coefficient of thermal expansion of the optical substrates.

26. A fiber-optic telecommunication systems comprising, in combination:

a fiber-optic trunk line carrying multi-channel light;

an optical block having first and second surfaces, the first surface lying in a first plane and the second surface lying in a second plane spaced from and parallel to the first plane, defining an optical gap between the first and second planes;

an optically transparent optical port means for bidirectional optical communication between the optical gap and the fiber-optic trunk line;

first-side channel ports each comprising a selectively optically transparent filter element in the first plane adhered to the first surface of the optical block; and second-side channel ports each comprising a selectively optically transparent filter element in the second plane adhered to the second surface of the optical block, the first-side channel ports and the second-side channel ports cooperatively defining between them at least a portion of a multi-point zig-zag light path through the optical gap, wherein each of multiple channel ports injects a channel of collimated light into the optical gap, and each of multiple channel ports passes a channel of collimated light out of the optical gap.

27. The fiber-optic telecommunication system of claim 26 wherein each filter element comprises a Fabry-Perot interference film stack on a first surface of an optical substrate, the film stack and first surface facing the optical gap.

28. The fiber-optic telecommunications system of claim 26 wherein the first-side channel ports and the second-side channel ports each is substantially rectilinear, and is adhered to the optical block by epoxy adhesive comprising a monolayer of spacer beads, and each of the first-side channel ports is spaced at least 0.1 mm from each other and each of the second-side channel ports is spaced at least 0.1 mm from each other.

29. The fiber-optic telecommunication system of claim 26 wherein the first-side channel ports collectively form a continuously variable filter element adhered to the first surface of the optical block, the filter elements of the first-side channel ports being linearly spaced locations of the continuously variable filter element, and the second-side channel ports collectively form a second continuously variable filter element adhered to the second surface of the optical block, the filter elements of the second-side channel ports being linearly spaced locations of the second continuously variable filter element, each of the spaced locations being selectively optically transparent to a different wavelength subrange.

30. The fiber-optic telecommunication system of claim 25 wherein each continuously variable filter element comprises a Fabry-Perot interference film stack on an optical substrate, the coefficient of thermal expansion of the optical block being within $10 \times 10^{-6}$ per ° C. of the coefficient of thermal expansion of the optical substrates.

31. The fiber-optic telecommunication systems of claim 26 wherein the multi-channel light has center-to-center channel wavelength spacing of not more than 2 nm, the first surface are parallel to each other within 0.02 degrees, and the first-side channel ports and second-side channel ports are adhered to the optical block by epoxy adhesive comprising spacer beads microspheres of diameter less than 20 microns.

32. An optical multiplexing device for multi-channel collimated light, comprising, in combination:

an optical block having first and second surfaces, the first surface lying in a first plane and the second surface lying in a second plane spaced from and parallel to the first plane, defining an optical gap between the first and second planes;

an optically transparent optical port means for optical communication with the optical gap;

first-side channel ports each comprising a selectively optically transparent filter element in the first plane adhered to the first surface of the optical block;

second-side channel ports each comprising a selectively optically transparent filter element in the second plane adhered to the second surface of the optical block, the first-side channel ports and the second-side channel ports cooperatively defining between them a multi-point zig-zag light path through the optical gap; and a last channel port along the multi-point light path further from the optical port, having no filter element secured to the optical block and having a post-filter remote from the optical block.

33. An optical multiplexing device for multi-channel collimated light, comprising, in combination:

a housing defining within it an hermetically sealed chamber;

an optical block mounted within the housing and having first and second surfaces, the first surface lying in a first plane and the second surface lying in a second plane spaced from and parallel to the first plane, defining an optical gap between the first and second planes;

an optically transparent optical port means in optical communication with the optical gap, comprising a collimator mounted on a surface of the housing within the chamber and a fiber-optic line from the collimator to outside the housing;

a channel port comprising a selectively optically transparent first filter element secured to the optical block in the first plane and a post-filter for further isolating in-band transmission through the first filter element, the post-filter being mounted on a surface of the housing within the chamber and non-coherently optically coupled to the first filter element; and a reflective element secured to the optical block in the second plane, the optical port, first filter element and reflective element cooperatively defining at least a portion of a multi-point zig-zag light path through the optical gap to a last channel port having a second post-filter mounted on a surface of the housing within the chamber and no filter element secured to the optical block.

34. The optical multiplexing device of claim 33 wherein the chamber is filled with nitrogen gas.

35. The optical multiplexing device of claim 33 wherein the optical block is formed of stainless steel.

36. The optical multiplexing device of claim 35 wherein the first filter element comprises a first film stack on an optical substrate and the reflective element comprises a second film stack on a second optical substrate, and the first film stack and second film stack are parallel to each other within 0.02 degrees.

37. The optical multiplexing device of claim 33 wherein the multi-channel collimated light has center-to-center channel wavelength spacing of not more than 2 nm, the first surface and the second surface are parallel to each other within 0.02 degrees, and the first channel port, and reflective element are adhered to the optical block by epoxy adhesive comprising a mono-layer of microspheres having diameter less than 20 microns.

38. The optical multiplexing device of claim 33 further comprising at least one collimator secured to the housing in the chamber on wire spacers embedded in adhesive.

39. An optical multiplexing device for multiplexing multi-channel light comprising, in combination:

an optically non-transparent optical block forming an optical slot between a first surface of the optical block and a second surface of the optical block, the second surface being spaced from and substantially parallel to the first surface, the optical slot having a multi-point light path therein;

an optical port transparent to multi-channel light, in optical communication with the optical slot;

a first channel port optically transparent to a first wavelength sub-range and reflective of other wavelengths, comprising a first filter element adhered to the first surface of the optical block spanning the optical slot; and a reflective element secured to the second surface of the optical block spanning the spanning the optical slot, the optical port, first filter element and reflective element cooperatively defining at least a portion of a multi-point zig-zag light path through the optical slot.

40. The optical multiplexing device in accordance with claim 39 wherein the first channel port further comprises a post-filter remote from the optical block and optically non-coherently coupled to the first filter element.

41. The optical multiplexing device in accordance with claim 40 wherein the interference filter element comprises a film stack on a surface of an optical substrate, the film stack facing the optical slot.

42. The optical multiplexing device in accordance with claim 41 wherein the interference filter element is adhered to the optical block with an adhesive comprising microspheres of substantially uniform diameter.

43. The optical multiplexing device in accordance with claim 42 wherein the adhesive contains microspheres of silica having diameter less than 20 microns.

44. The optical multiplexing device of claim 39, wherein the optical block further comprises a residual port along the multi-point light path through the optical block, transparent to residual wavelengths outside the first wavelength sub-range.

45. The optical multiplexing device in accordance with claim 39 further comprising at least one additional channel port along the multi-point light path, transparent to a second wavelength sub-range of the collimated light different from the first wavelength sub-range of the first channel port.

46. The optical multiplexing device in accordance with claim 45 wherein the first channel port and the additional channel port each comprises a separate multi-cavity interference filter element adhered to the optical block and spanning the optical slot.

47. The optical multiplexing device in accordance with claim 46 wherein the interference filter elements each comprises a film stack forming at least three cavities.

48. The optical multiplexing device in accordance with claim 45 wherein the channel ports are respective areas spaced along a variable thickness interference filter element adhered to the optical block spanning the optical slot.

49. The optical multiplexing device in accordance with claim 48 wherein a broadband reflector element is adhered to the optical block spanning the optical slot at the second surface and the variable thickness interference filter element is adhered to the optical block spanning the optical slot at the first surface.

50. The optical multiplexing device of claim 49 wherein the variable thickness interference filter element comprises a film stack on a surface of an optical substrate facing the optical slot.

51. The optical multiplexing device in accordance with claim 50 wherein the thickness of the film stack of the variable thickness interference filter is continuously variable in a direction from the first channel port toward the additional channel port.

52. The optical multiplexing device in accordance with claim 51 wherein the thickness of the film stack is substantially linearly variable.

53. The optical multiplexing device in accordance with claim 39 wherein the optical port comprises a collimator for multi-channel collimated light directed into the optical slot at a tilt angle "c" between 5° and about 10°.

54. The optical multiplexing device in accordance with claim 53 wherein the tilt angle "c" is adjustable to control the first wavelength sub-range.

55. The optical multiplexing device in accordance with claim 39 wherein the first channel port further comprises a lens for focusing collimated light.

56. The optical multiplexing device in accordance with claim 55 wherein the lens means comprises a GRIN lens communicating with optic fiber.

57. The optical multiplexing device in accordance with claim 39 further comprising a housing forming a hermetically sealed chamber in which the optical block is contained.

58. The optical multiplexing device in accordance with claim 39 further comprising an optically opaque end cap positioned along the multi-point light path.

59. The optical multiplexing device in accordance with claim 39 wherein the optical block is formed of ceramic or metal.

60. The optical multiplexing device in accordance with claim 39 wherein the first filter element comprises a film stack on a surface of a monoplanar optical substrate, the film stack facing into the optical slot, and the reflective element comprises a second film stack on a surface of a second monoplanar optical substrate, the second film stack facing into the optical slot, the first film stack and the second film stack being parallel to each other within 0.02 degrees.

* * * * *